May 15, 1934.  G. W. HARPER  1,958,788
SPEEDOMETER DRIVE
Filed Aug. 29, 1932  4 Sheets-Sheet 1
Fig.1.
Fig.2.
Fig.3.
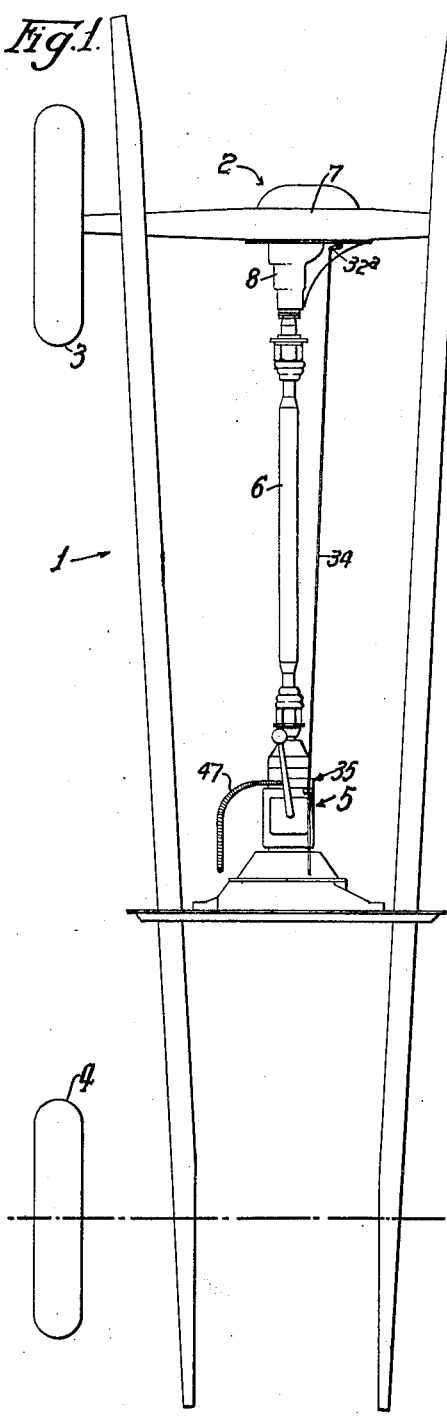
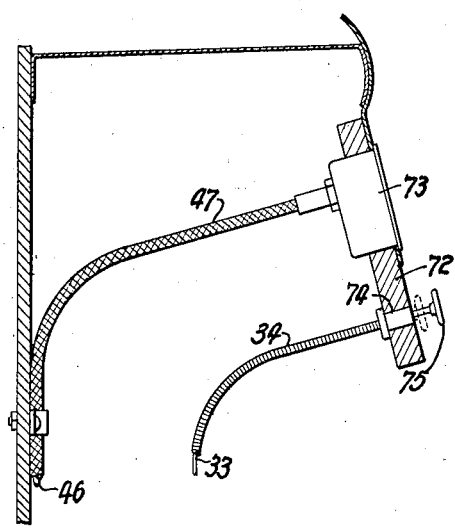
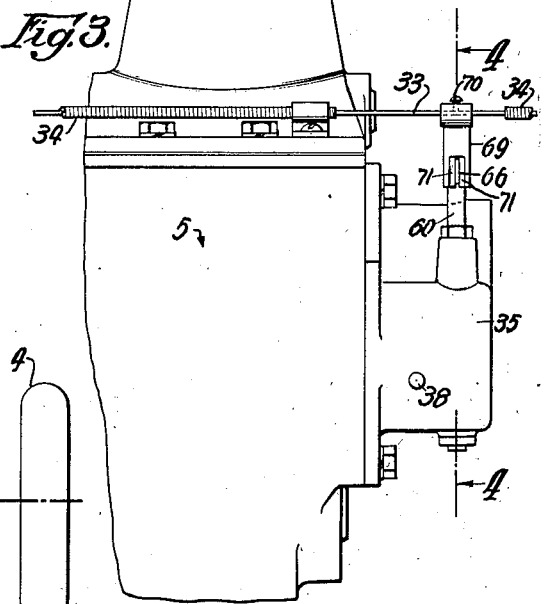
Inventor:
George W. Harper,
By: Arthur W. Nelson
Atty.

Inventor:
George W. Harper
By: Arthur Wm Ulrich
Att'y.

May 15, 1934.   G. W. HARPER   1,958,788
SPEEDOMETER DRIVE
Filed Aug. 29, 1932    4 Sheets-Sheet 3
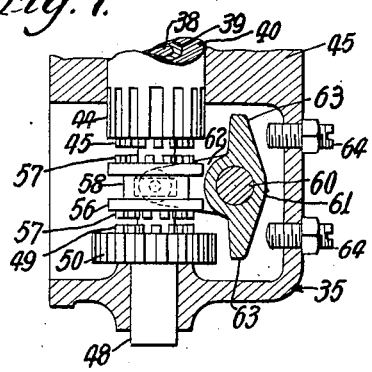
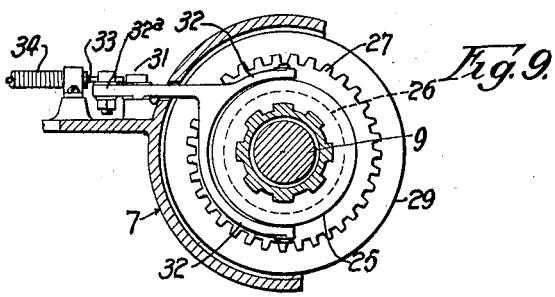
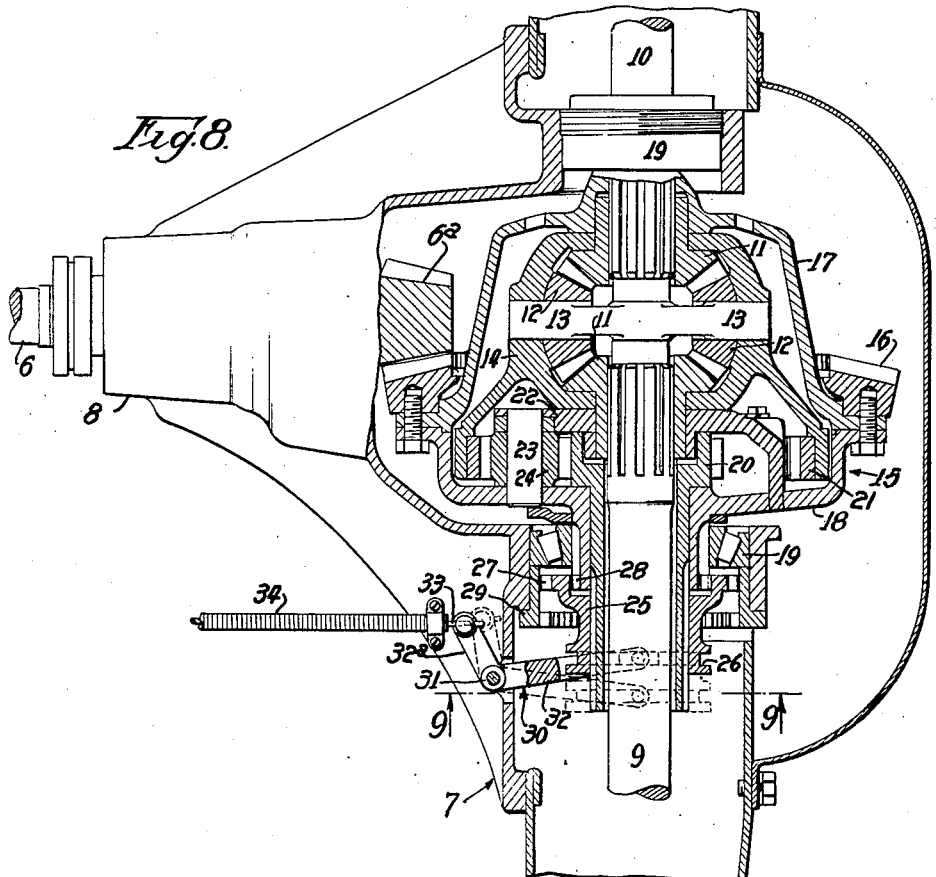

May 15, 1934.  G. W. HARPER  1,958,788
SPEEDOMETER DRIVE
Filed Aug. 29, 1932   4 Sheets-Sheet 4
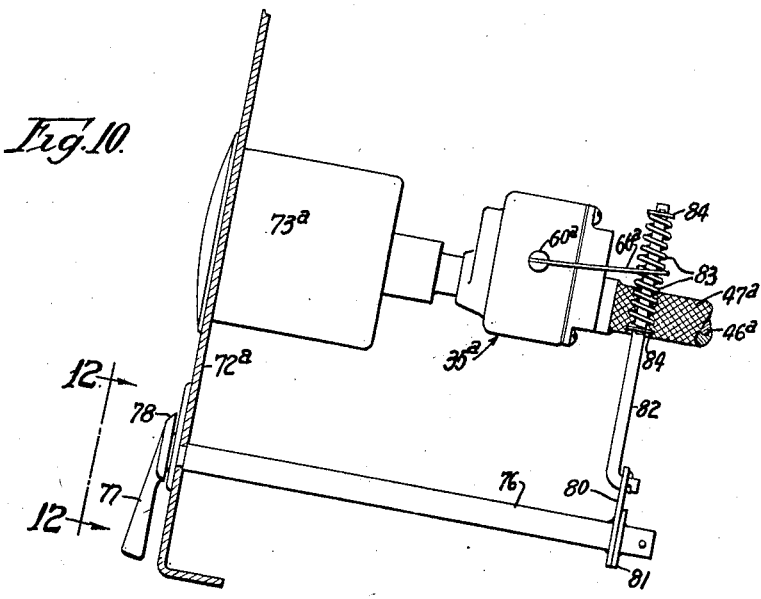
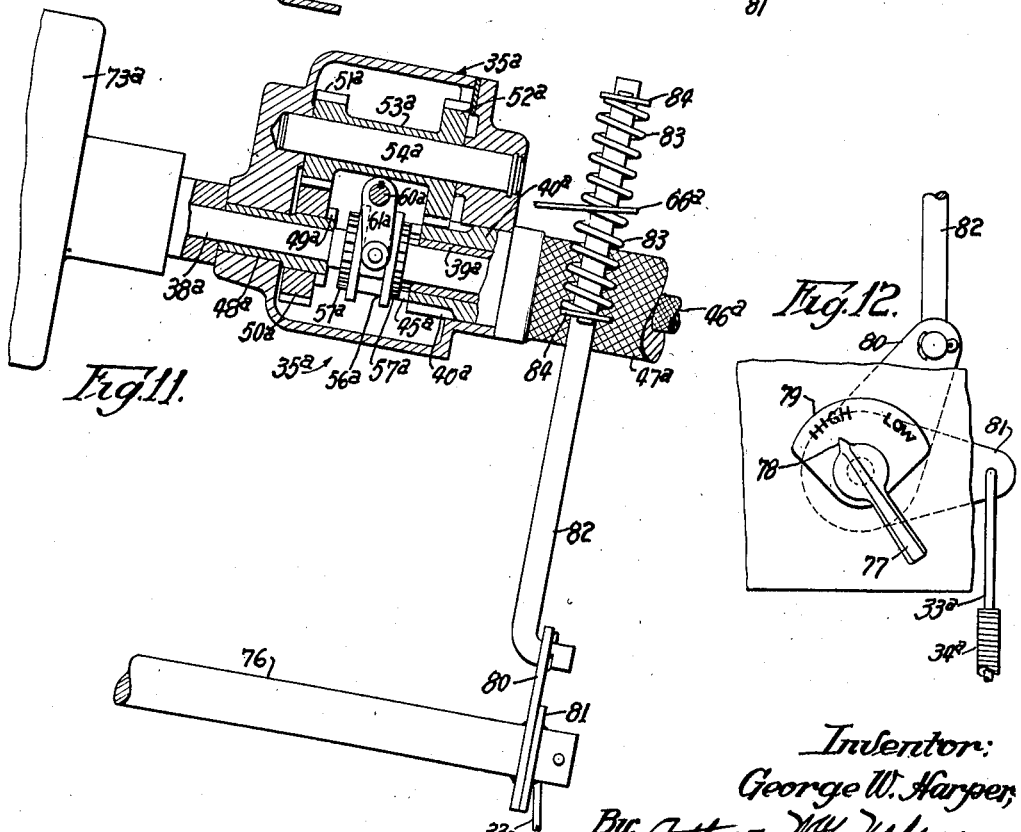
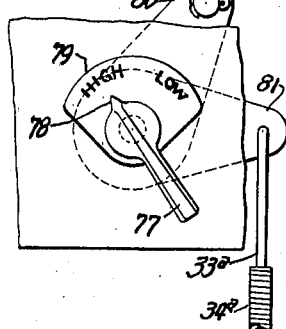

Patented May 15, 1934

1,958,788

UNITED STATES PATENT OFFICE 1,958,788

SPEEDOMETER DRIVE

George W. Harper, Cleveland, Ohio, assignor to The Columbia Axle Company, Cleveland, Ohio, a corporation of Ohio Application August 29, 1932, Serial No. 630,892

1 Claim. (Cl. 74—325)

This invention relates to improvements in speedometer drives and it consists of the matters hereinafter described and more particularly pointed out in the appended claims.

The primary object of the invention is to provide a drive for the speedometer of an automobile having a multi-speed driving axle, whereby the speedometer may be coordinated with the axle when the same is being driven in any of its relative speeds with respect to its associated drive or propeller shaft.

Another object of the invention is to provide a drive of this kind including means operable to select the desired relative speed between the axle and propeller shaft and which means is so connected to the drive for the speedometer as to coordinate the same with the axle.

A further object of the invention is to provide a drive of this kind which is simple in its construction and yet is positive and quiet in its operation for its intended purpose.

The above mentioned objects of the invention as well as others, together with the many advantages thereof will more fully appear as I proceed with my specification.

In the drawings:

Fig. 1 is a more or less diagrammatic plan view of the chassis of an automobile in which is embodied, one form of my improved speedometer drive;

Fig. 2 is a vertical sectional view on an enlarged scale through the instrument board of the automobile shown in Fig. 1 and discloses more particularly the speedometer itself and the manually operable means, whereby said speedometer may be coordinated with respect to the driving axle of said automobile;

Fig. 3 is a view in side elevation of the rear end part of the transmission wherein the driving mechanism for the speedometer is located, in accordance with one form of the invention.

Fig. 7 is another horizontal detail sectional view through another part of the mechanism shown in Fig. 4 as taken on the line 7—7 of Fig. 5;

Fig. 8 is a horizontal sectional view through the differential of the automobile, whereby one or the other of a number of different ratios in drives between the axle shafts and the propeller shaft may be afforded;

Fig. 9 is a vertical detail sectional view through a part of the axle as taken on the line 9—9 of Fig. 8;

Fig. 10 is a vertical sectional view through the instrument board of the automobile and wherein the drive for the speedometer is disposed just to the rear of the same instead of in the rear end of the transmission as in Fig. 4;

Fig. 11 is a view on an enlarged scale of the parts shown in Fig. 10 with certain of said parts shown in section to better illustrate the invention; and Fig. 12 is a view in front elevation of a part of the instrument board shown in Fig. 10 and illustrates more particularly the means whereby the desired speed for the axle and speedometer may be selected.

Figure 4:
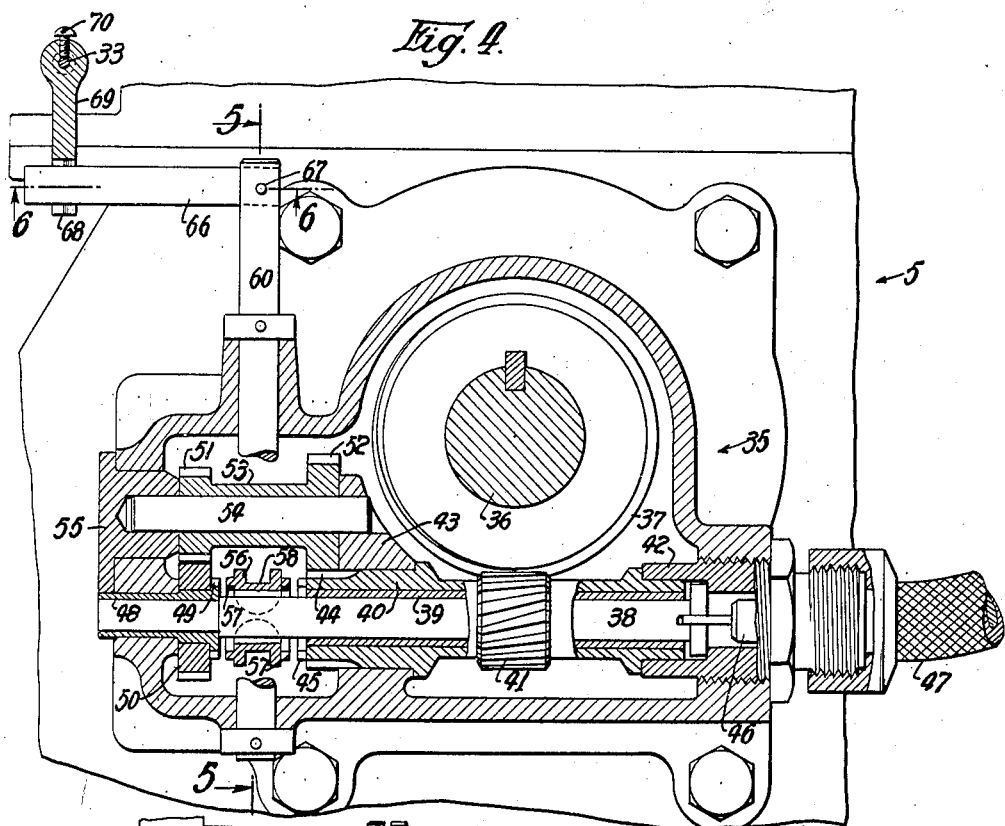
Fig. 4 is a transverse vertical sectional view through the rear end part of the transmission shown in Fig. 3 and discloses more particularly the multi-speed drive for the speedometer and its connections with the power take-off end of the driven shaft of the transmission.
Figure 5:
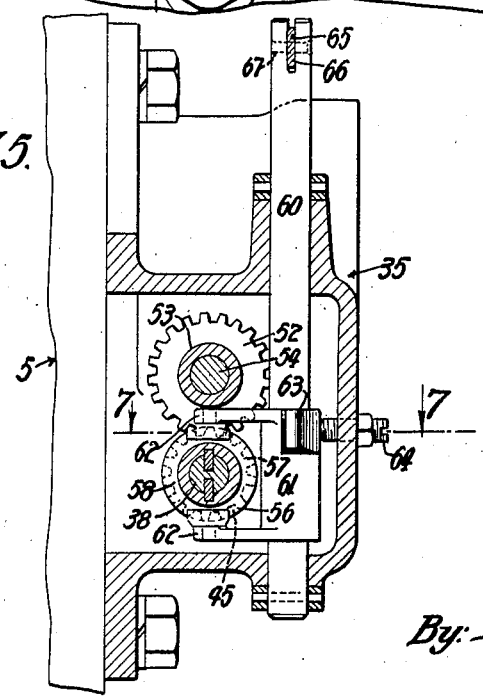
Fig. 5 is a vertical detail sectional view through a part of the speedometer drive mechanism as taken on the line 5—5 of Fig. 4.

In general, the invention is more particularly concerned with driving the speedometer in coordination with a multi-speed axle; that is, an axle the wheel driving shafts of which may be driven at the desired speed ratio with respect to its associated propeller shaft which in turn is driven from the power take-off end of the driven shaft of the transmission.

When the wheel driving shafts of the axle may be driven in one or the other of two different ratios with respect to the associated propeller shaft, such an axle has become known as a "dual-ratio" axle. The drive for the associated speedometer, must of course therefore, be coordinated with the wheel driving shafts, otherwise a false reading would result in the speedometer in at least one of the speed ratios of said shafts.

The desired speed ratio for the axle shafts may be selected by manipulation of a button or the like, preferably mounted on the instrument board and this button is so connected up with a part of the drive for the speedometer as to coordinate the same with the desired speed ratio of the axle shafts.

In modern automobiles, the speedometer drive is provided by a flexible shaft driven by the driven shaft of the transmission. The mechanism for coordinating the speedometer and wheel driving shafts in this instance includes change speed gearing. In accordance with one embodiment of the invention this gearing is located at the rear end of the transmission and in accordance with another embodiment of the invention, it is located as a unit closely to the rear of the associated speedometer. In either instance, the gearing is shifted from one ratio to another in accordance with the change in ratio between the wheel driving shafts of the axle and the propeller shaft.

Referring now in detail to that embodiment of the invention, illustrated in the accompanying drawings and especially that embodiment shown in Figs. 1 to 9 inclusive thereof: 1 indicates as a whole the chassis of an automobile, 2 indicates the rear axle housing of the automobile and 3 and 4 indicate the rear and front wheels respectively of the automobile. 5 indicates the usual change speed transmission and 6 indicates the propeller shaft whereby power is transmitted from the driven shaft of the transmission to the wheel driving shafts for the rear wheels 3.

The axle housing is provided at a point midway between its ends with a hollow enlargement providing the differential housing 7 which includes at the front side thereof, a tubular extension 8 of conventional form. Within this housing 7, is located differential gearing and mechanism providing a dual ratio axle. As the mechanism thereof forms no part of the present invention, it will not be described in detail but only in general, and to that extent, sufficient to make clear the real purpose of the invention.

9 and 10 indicate respectively, the left and right hand axle shafts for driving the corresponding rear wheels 3 of the automobile. The inner ends of said shafts have a splined connection with bevel pinions 11 which in turn mesh with pinions 12 journalled on stub shafts 13 mounted in a pinion cage 14. This cage is enclosed in a casing 15 that carries a ring gear 16. The casing 15 comprises right and left hand end parts 17 and 18 respectively. The casing part 17 includes an end hub within which the shaft 10 is positioned and which hub is journalled in an antifriction bearing 19 supported in a part of the housing 7. The casing part 18 includes an externally splined hub through which the shaft extends and said hub is journalled in an antifriction bearing 19 supported in a part of the housing 7. Between the shaft 9 and hub of the casing part 18 is located the splined hub of a sun gear 20.

The cage 14 includes a flange that faces toward the casing part 18 and there carries an internal gear ring 21 that is arranged in the plane of the sun gear. In the casing part 18 and in a plate 22 spaced axially therefrom, there is supported a plurality of stub shafts 23, upon each of which is journalled a planetary gear 24 that meshes with both the sun gear 20 and the internal gear ring 21.

Longitudinally shiftable on the splined hub of the sun gear is a collar 25 having a shifting yoke receiving groove 26 in its outer end and external and internal spline teeth 27—28 on its inner end. Fixed in the differential housing is an internally splined ring 29. A shifter yoke 30 is pivoted to the casing 7 as at 31. This yoke includes shifter arms 32 for engagement in the groove 26 of the collar 25 and an angularly disposed arm 32a by which power is applied to the yoke 30 to shift the collar 25 in one direction or the other.

When the yoke 30 is actuated to shift the collar inwardly along the hub of the sun gear, the teeth 28 of said collar will engage with the splined end of the hub of the casing part 18 and will lock the sun gear to said casing part. When the yoke 30 is actuated to shift the collar outwardly along the hub of the sun gear, the teeth 27 of said collar will engage the teeth of the internally splined ring 29 and this will hold the sun gear stationary against rotation.

On the propeller shaft 6 within the extension 8 is fixed a pinion 6a which meshes with the ring gear 16. With said pinion driving the ring gear and with the collar 25 shifted inwardly to lock the sun gear to the casing part 18 the planetary gears 24 are held against rotation and therefore act as driving lugs or keys to drive the ring 21. This ring 21 will drive the cage 14 and through bevel pinions 12 and 11, will drive the wheel driving or axle shafts 9 and 10. When said collar 25 is moved outwardly to engage and lock with the fixed ring 29, it also locks the sun gear against movement and frees the casing part 18. In the rotation thereof, the planetary gears rotate on their stub shafts 23 and thus drive the ring 21 and through it the cage 14 to the shafts 9 and 10 as before. This driving action on the cage 14 will be at a speed greater than that when said sun gear is locked against rotation.

The shifter yoke 30 may be moved in one direction or the other by any suitable means, either mechanically, electrically, hydraulically or by a vacuous condition. In the drawings and especially in Fig. 8, I have shown this means in its simplest mechanical form, such as a Bowden wire 33 in an associated sheath 34. One end of said wire is clamped to the arm 32a of the yoke 30 in any suitable manner while the other end is connected up to a prime mover or actuating device preferably located on the instrument board of the automobile as will later appear.

At the rear end of the transmission casing is a smaller speedometer driving mechanism casing 35 which has a bolted on connection with said transmission casing. The driven shaft 36 of the transmission extends through said casing 35 and is therein provided with a worm 37. Transversely positioned in the casing 35, a suitable distance below the shaft 36, is a shaft 38. Surrounding the shaft 38 and spaced therefrom by a bushing 39, is a tubular shaft 40 including a worm gear 41 that is engaged by the worm 37 positioned on the shaft 36.

One end (the right hand end as viewed in Fig. 4) of said tubular shaft is externally journalled in a bushing 42 fixed in one side wall of the casing, while a part of the other end (the left hand end as viewed in said Fig. 4) is externally journalled in a boss 43 forming a part of the casing 35. That part of said last mentioned end of said tubular shaft beyond said boss is made to provide a gear 44 and the extremity of said end is provided with clutch teeth 45.

One end of the shaft 38 extends into the bushing 42 where it has connected thereto a flexible shaft 46 for driving the speedometer mechanism as will later appear and this flexible shaft is enclosed in a flexible sheath 47. The other end of the shaft 38 is reduced in diameter to journal in a sleeve 48 which in turn is externally journalled in a part of the casing 35 and the inner end of said sleeve is made to provide clutch teeth 49, that are spaced a suitable distance from the clutch teeth 45 on the extremity of the tubular shaft 40.

Fixed on the sleeve 48 is a gear 50 of a diameter somewhat larger than that of the gear 44 on the tubular shaft 40. These gears are in constant mesh with gears 51 and 52 respectively made integral with a sleeve 53 that is journalled on a shaft 54 arranged above and parallel with the associated end of the shaft 38. The shaft 54 engages at one end in the boss 43 before mentioned and engages at its other end in a plug 55 disposed in an opening in a side wall of the casing 35.

On the shaft 38 between the clutch teeth 45—49 is located a clutch collar 56 that is rotative with the shaft but is shiftable longitudinally thereof within definite limits. Said collar is provided at its ends with clutch teeth 57 for engagement with the clutch teeth 45—49 before mentioned and between said ends there is provided an annular groove 58 to receive the arms of a yoke whereby said collar may be shifted from an engagement with the clutch teeth 45 into engagement with the clutch teeth 49 and vice versa.

When the collar has been shifted inwardly to engage one set of its teeth 57 with the teeth 45, this connects the shafts 38 and 40 together, the gear 50 running idly under the driving action of the gears 51—52 and sleeve 53. When said collar 56 is shifted outwardly to engage its other set of teeth 57 with the teeth 49 this engagement causes the shaft 38 to be driven at a speed less than that of the tubular shaft 40.

It is pointed out that the ratios of speed capable of being provided between the wheel driving shafts and the propeller shaft, correspond to the ratios of speeds capable of being provided between the shaft 38 and the tubular shaft 40 through and without the gearing mentioned.

To shift the collar 56 in one direction or the other, I provide the following arrangement:

60 indicates an upright rock shaft suitably journalled in the casing 35 to the rear of the collar 56 and in a plane midway between the clutch teeth 45—49. On the shaft 60 within the casing 35 is secured a yoke 61 having top and bottom arms 62 operatively engaged in the groove 58 of the collar 56. Said yoke also includes lateral extensions 63 for engagement with adjustable stops 64 in the form of set screws to limit the amount of rocking movement of the shaft 60.

Figure 6:
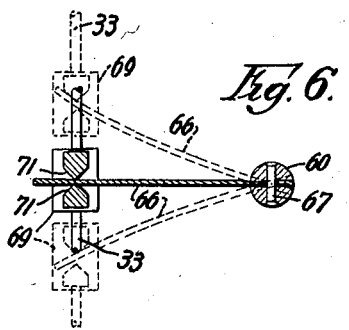
Fig. 6 is a horizontal detail sectional view through the same as taken on the line 6—6 of Fig. 4.

The top end of the vertically disposed rock shaft extends into a position above the top of the casing 35 and is there provided with a diametrically extending slot 65 in which one end of a flexible arm 66 is secured by a pin 67. This arm is in the form of a relatively stiff, edgewise disposed leaf spring the other end of which is embraced by the spaced arms 68 of an actuating element 69. This element is clamped to a mid portion of the Bowden wire 33 before mentioned, by a set screw 70. The arms 68 are of such cross section as to present V-shaped edges 71 to opposite sides of the end of the arm 66 as best shown in Fig. 6 to better impart movement to said arm without cramping the same when said element is moved by the Bowden wire. This action of said arms of said element is best illustrated by the dotted line positions shown in said Fig. 6.

72 (see Fig. 2) indicates the instrument board of the automobile. In said board is anchored a speedometer 73 of any conventional type and to which the other end of the before mentioned flexible shaft 46 is operatively connected. Just below said speedometer there is provided in said board a bushing 74 to receive the other end of the Bowden wire 33 and said end of said wire has connected thereto a push and pull button or knob 75.

While the collar 56 is shown in Figs. 4 and 7 as being in a neutral position, this is only for the purpose of better illustrating the clutch teeth 57 on the ends thereof because under all conditions, it is desired that said collar be clutchingly engaged with the teeth 45—49 of either the tubular shaft 40 or the sleeve 48. The reason for this engagement is apparent because the engaged positions of this collar correspond to engaged positions of the collar 25 which is always engaged with either the ring 27 or with the hub of the part 18 of the housing 15.

The parts are so arranged that when the knob 75 is in the pulled out full line position shown in Fig. 2, the collar 25 in the rear axle is engaged with the splined hub of said part 18. At the same time the collar 56 (within the casing 35 at the rear of the transmission) is to the right of neutral (Fig. 4) so that the teeth 57 thereof engage the teeth 45 of the tubular shaft 40. With the parts in such positions, the drive to the axle shafts and to the speedometer are coordinated in ratios with respect to the shaft 36 of the transmission.

When the operator desires to change the ratio between the said axle shafts and the propeller shaft 6 (which rotates 1 to 1 with respect to the shaft 36 of the transmission) the knob 75 is pushed inwardly and through the Bowden wire 33 the yoke 30 is swung clockwise from the full line position shown in Fig. 8 to the dotted line position shown therein, so as to engage the collar 25 with the fixed ring 27. This locks the sun gear 20 against movement so that the casing 15 rotates around said gear and through the pinions 24 and ring 21 drives the cage 14 and axle shafts 9 and 10 at a higher relative speed with respect to the propeller shaft.

As the element 69 is fixed or clamped to the mid portion of the Bowden wire, it is apparent that when said Bowden wire is moved rearwardly, this will impart a counterclockwise movement to the flexible arm 66. Through the yoke 61, and its arms 62, the collar 56 is moved outwardly on the shaft 38 to engage the clutch member 49 and this locks the gear 50 to said shaft. Thus the drive is from the shaft 36 through the gears 44, 52, 51 and 50 to the shaft 38 so that the speed at which said shaft 38 is now driven is coordinated with the axle shafts 9 and 10.

Of course, the shifting movement of the collars 25 and 56 is substantially simultaneous and should the clutch teeth 45—57 or 49—57 meet head on, no harm results as the arm 66 will flex to accommodate the same. So soon however, that said teeth snap into engagement, the turning pressure of said arm when under tension will cause movement of the clutch member 19 into complete engagement with the teeth 45—49 according to which way the clutch is being shifted. This shifting movement of the clutch 56, is limited by the stops 64 and thus the spring arm 66 cannot act to so hold the yoke arms 62 in such engagement against one side or the other of the groove 58 in the collar as to impose unnecessary wear on either said arms or sides of said groove.

It is apparent that by means of the drive thus provided for the speedometer, it is automatically coordinated with the drive provided by the dual ratio axle so that a true speedometer reading is afforded no matter what ratio the axle happens to be in when the car is being driven along a highway or the like.

While I have described the mechanism, which coordinates the speedometer with the axle shafts as located in the transmission casing, this location is not absolutely essential to the invention because it may also be located outside of the transmission and nearer to the speedometer.

In Figs. 10, 11 and 12 is illustrated an arrangement wherein said coordinating mechanism is located just to the rear of the speedometer 73a which is mounted in the instrument board 72a as before. With such an arrangement, I provide a suitable casing 35a in which a shaft 38a is suitably journalled, with one end extending beyond said casing and into and operatively connected to the mechanism of the speedometer 73a. The other end of said shaft bears in a bushing 39a within a gear-like sleeve 40a that is driven by the flexible shaft 46a in the sheath 47a.

The gear-like sleeve 40a is provided at its end with clutch teeth 45a and on that part of said shaft 38a associated with the speedometer end of the casing is loosely mounted a sleeve 48a having clutch teeth 49a. Fixed on said sleeve is a gear 50a.

Above the shaft 38a is provided a second shaft 54a suitably fixed at its ends in the casing 35a and rotative on said shaft is a sleeve 53a carrying end gears 51a—52a that are in constant mesh with the gear 50a and the gear-like sleeve 40a respectively. On the shaft 38 between the gear 50a and said gear-like sleeve 40a is a clutch collar 56a. This collar has clutch teeth 57a at both ends so that when said collar is shifted in one direction, it locks the shaft 38a to the sleeve 48a and when shifted in the other direction, it locks said shaft to the sleeve-like gear 40a.

In the casing 35a between the shafts 38a—54a and extending at a right angle thereto is journalled a transverse rock shaft 60a one end of which extends beyond one side of the casing to there have attached thereto a flexible arm 66a. Secured to said shaft 60a in the casing is a yoke 61a having arms that engage in the groove of the collar 56a. It is apparent that when the shaft 60a is rocked in one direction or the other by the arm 66a, said clutch is shifted to connect the collar to the gear member 40a or to connect the collar to the sleeve 48a. When the collar locks the shaft 38a to the sleeve 48a, said shaft is driven at a differential in speed with respect to sleeve-like gear 40a.

With a construction as above described, a slightly modified form of actuating mechanism is desired and such mechanism is as follows:

76 indicates a rock shaft that is journalled at one end in the instrument board 72a below the speedometer and extends a suitable distance rearwardly therefrom. On the front end of said shaft, to the front of the instrument board is fixed a lever 77 including a pointed finger 78. On said face of the instrument board is an indicator plate 79 bearing the legends "High" and "Low" to show to the operator which way said lever should be turned to give the desired position of the collar 56a in accordance with the position of the collar 25 in the differential.

On the rear end of said shaft 76 arms 80 and 81 are fixed so as to turn with said shaft. A link 82 is operatively connected at one end to the arm 80 while its other end extends through an opening provided therefor in the spring arm 66a. Mounted on said link 80 upon either side of the arm 66a are top and bottom springs 83 both of which abut at one end with said arm and abut at the other end against suitable stop washers and pins 84. The arm 81 has fixed thereto one end of a Bowden wire 33a (corresponding to the wire 33 before mentioned) the other end of which is secured to the arm 32a of the yoke 30 associated with the clutch collar 25 of the differential.

When the lever 77 is turned in one direction or the other to select either the "High" or "Low" for the differential, this rocks the shaft 76 in the proper direction and through the arms 80—81 operates to shift the collars 56a—25 to provide either the "High" or the "Low" as desired.

In the shift of the collar 56a should the teeth 57a meet head-on with either the teeth 45a or 49a, the springs 83 and arm 66a will yield and so soon as the sleeve-like gear 40a is rotated, the engaged teeth will snap into complete clutching engagement.

By the arrangement described, the drive for the speedometer is coordinated with that of the driving shaft through the same means that operates to select that ratio of said shafts with respect to the drive shaft of the transmission.

It is also pointed out that the mechanism described in no manner interferes with driving the automobile in reverse as is sometimes necessary and no effort is required on the part of the operator when changing from forward speed to reverse.

While in describing the invention, I have referred in detail to the form, construction and arrangement of the various parts thereof, the same is to be considered only in an illustrative sense and therefore, I do not wish to be limited thereto except as may be specifically set forth in the appended claim.

I claim as my invention:

In an automobile, a wheel driving axle, a power transmitting shaft associated therewith, gearing including a shiftable clutch element for providing different gear ratios between said axle and shaft, a speedometer, means between said shaft and speedometer and including gearing and a shiftable clutch element providing different speed ratios therebetween which are coordinated with the ratios of said axle, means for shifting the clutch element of the gearing for driving the speedometer to provide the desired ratio therein and including a flexible arm, means for shifting the clutch element of the gearing of the axle to provide the desired gear ratio therein and manually operable means for imparting movement to said arm and for causing a shifting movement of the clutch element of the gearing associated with the axle.

GEORGE W. HARPER.